(12) United States Patent
Yamamoto

(10) Patent No.: US 7,990,468 B2
(45) Date of Patent: Aug. 2, 2011

(54) MONITOR CAMERA HAVING A DUAL STRUCTURE COVER

(75) Inventor: Koji Yamamoto, Nara (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 399 days.

(21) Appl. No.: 12/279,923

(22) PCT Filed: Jan. 31, 2007

(86) PCT No.: PCT/JP2007/051553
§ 371 (c)(1),
(2), (4) Date: Aug. 19, 2008

(87) PCT Pub. No.: WO2007/097164
PCT Pub. Date: Aug. 30, 2007

(65) Prior Publication Data
US 2010/0225802 A1   Sep. 9, 2010

(30) Foreign Application Priority Data

Feb. 21, 2006  (JP) ................. 2006-043295

(51) Int. Cl.
*H04N 5/225* (2006.01)

(52) U.S. Cl. ...................................... 348/373

(58) Field of Classification Search ............ 348/143, 348/144, 146, 150, 151, 373, 374
See application file for complete search history.

(56) References Cited

U.S. PATENT DOCUMENTS

| | | | |
|---|---|---|---|
| 3,819,856 A | 6/1974 | Pearl, deceased et al. | |
| 5,111,288 A * | 5/1992 | Blackshear | 348/143 |
| 6,234,691 B1 * | 5/2001 | Jones et al. | 396/427 |
| 6,354,749 B1 * | 3/2002 | Pfaffenberger, II | 396/427 |
| 6,357,936 B1 | 3/2002 | Elberbaum | |
| 7,217,045 B2 * | 5/2007 | Jones | 396/427 |
| 7,495,703 B2 * | 2/2009 | Arbuckle | 348/375 |
| 2001/0022627 A1 * | 9/2001 | Bernhardt | 348/373 |

(Continued)

FOREIGN PATENT DOCUMENTS

EP   1515288 A1   3/2005

(Continued)

OTHER PUBLICATIONS

Translation of Japanese Publication No. 2001-301783, Oct. 31, 2001, Hirota.*
Translation of Japanese Publication No. 2004-356668, Dec. 16, 2004, Nakahira.*

(Continued)

*Primary Examiner* — Nicholas G Giles
(74) *Attorney, Agent, or Firm* — Westerman, Hattori, Daniels & Adrian, LLP

(57) ABSTRACT

The monitor camera (9) comprises a pedestal (1) to be attached to a mounting surface, an imaging device (7) rotatably attached so as to be rotatable around the central axis L of the pedestal (1), and a dome-type cover (3) having a window (30) and being rotatably attached to the pedestal (1) so as to cover the imaging device (7). The dome-type cover (3) includes an inner cover (5) having an open window (50) in the position corresponding to the window (30) and an outer cover (4) placed over the inner cover (5). The outer cover (4) and the inner cover (5) have an engagement part (6) at which both the covers (4) and (5) are engaged by a specific manual operation of the outer cover (4).

3 Claims, 7 Drawing Sheets

U.S. PATENT DOCUMENTS

| | | | | |
|---|---|---|---|---|
| 2007/0126871 A1* | 6/2007 | Henninger et al. | ............ | 348/151 |
| 2007/0126872 A1* | 6/2007 | Bolotine et al. | .............. | 348/151 |

FOREIGN PATENT DOCUMENTS

| | | | |
|---|---|---|---|
| JP | 11-180456 | A | 7/1999 |
| JP | 11180456 | A | 7/1999 |
| JP | 2001-301783 | A | 10/2001 |
| JP | 2001301783 | A | 10/2001 |
| JP | 2004-356668 | A | 12/2004 |
| JP | 2004-356669 | A | 12/2004 |
| JP | 2004356668 | A | 12/2004 |
| KR | 10-2004-0068810 | A | 8/2004 |

OTHER PUBLICATIONS

International Search Report of PCT/JP2007/051553, date of mailing May 1, 2007.

Notification of Transmittal of Translation of the International Preliminary Report on Patentability. (Form PCT/IB/338) of International Application No. PCT/JP2007/051553 mailed Sep. 4, 2008 with Forms PCT/IB/373 and PCT/ISA/237.

Japanese Office Action dated Oct. 5, 2010 issued in correspondig Japanese Patent Application No. 2006-043295.

Supplementary European Search Report dated Apr. 14, 2011, issued in corresponding European Patent Application No. 07707771.7.

* cited by examiner

[Fig. 1]
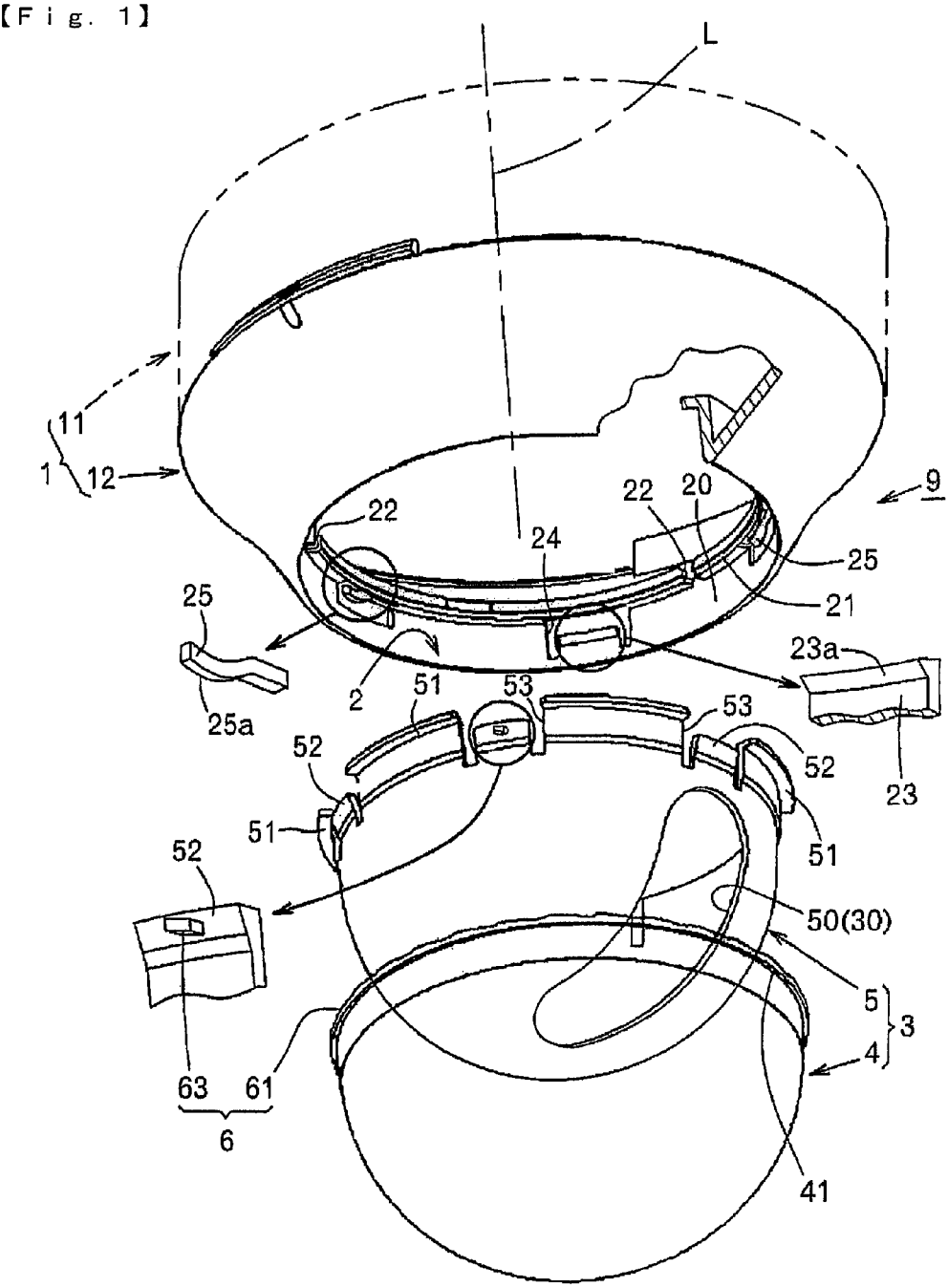

[Fig. 2]
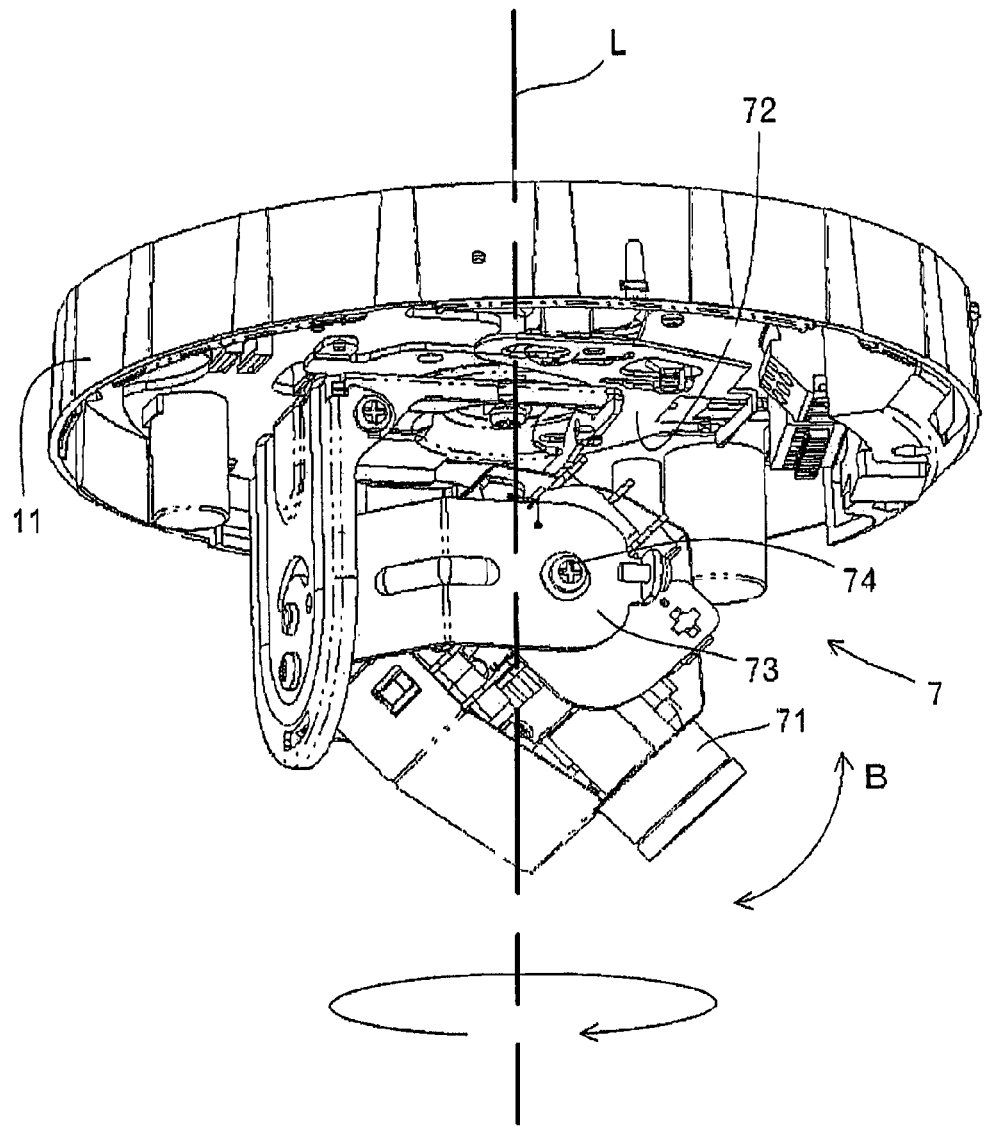

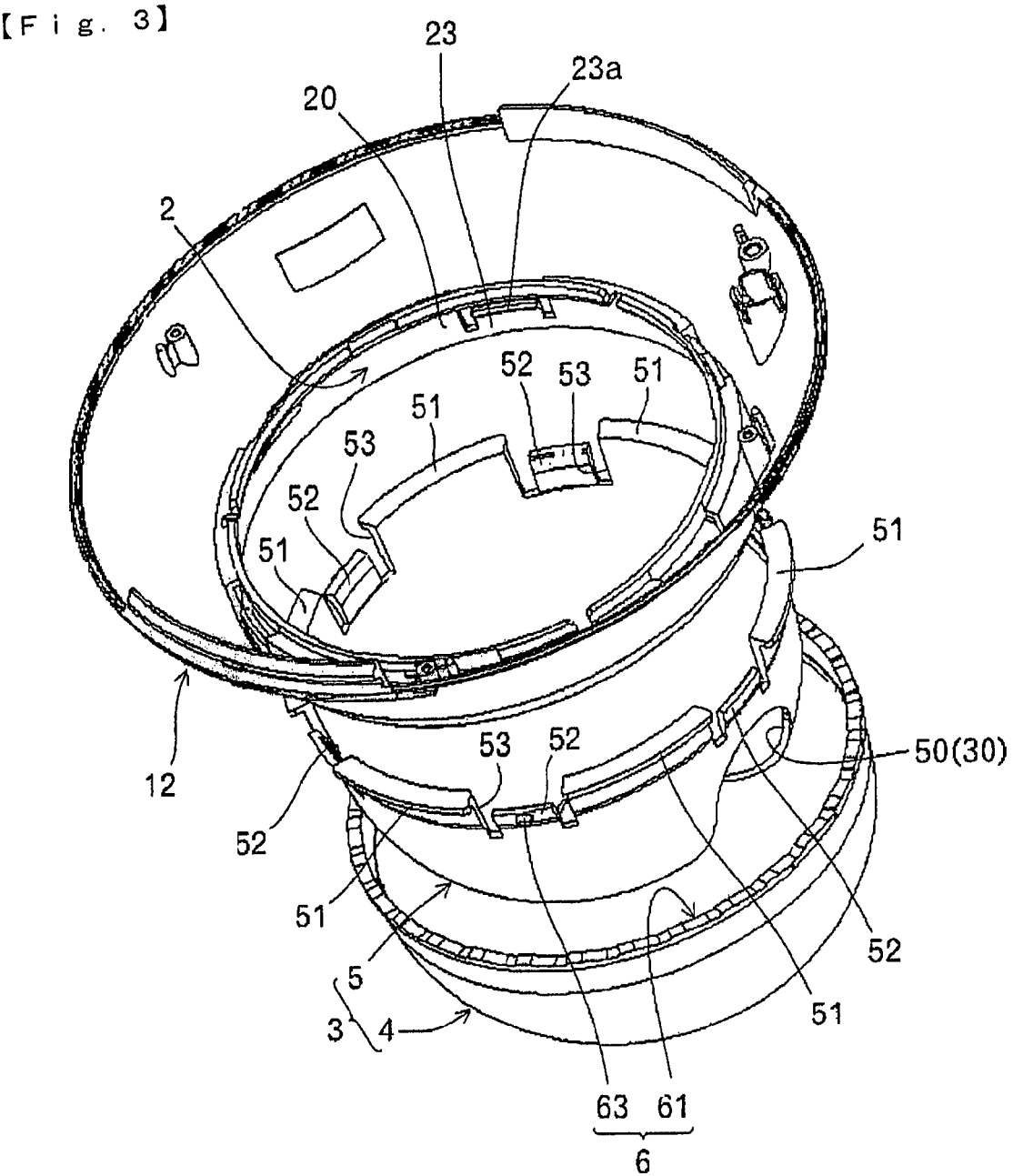
[Fig. 3]

[Fig. 4]
(a)
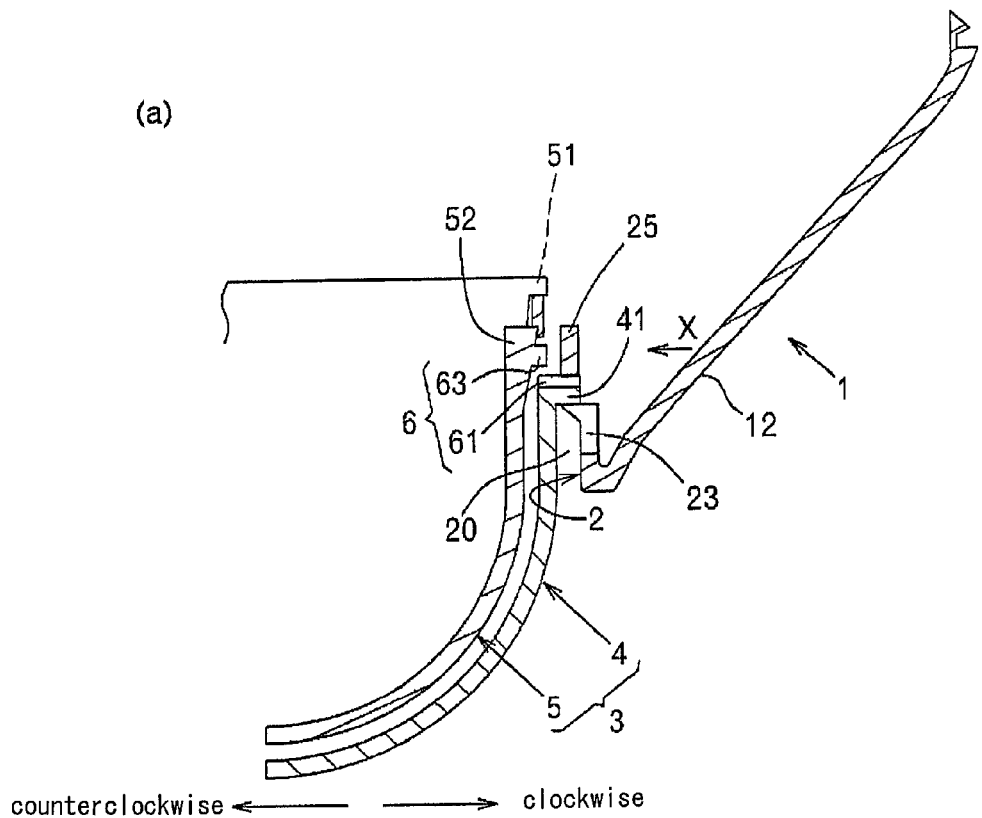
counterclockwise ← → clockwise
(b)
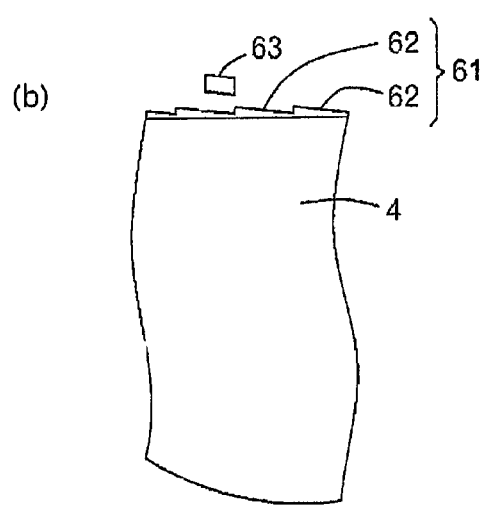

[Fig. 5]
(a)
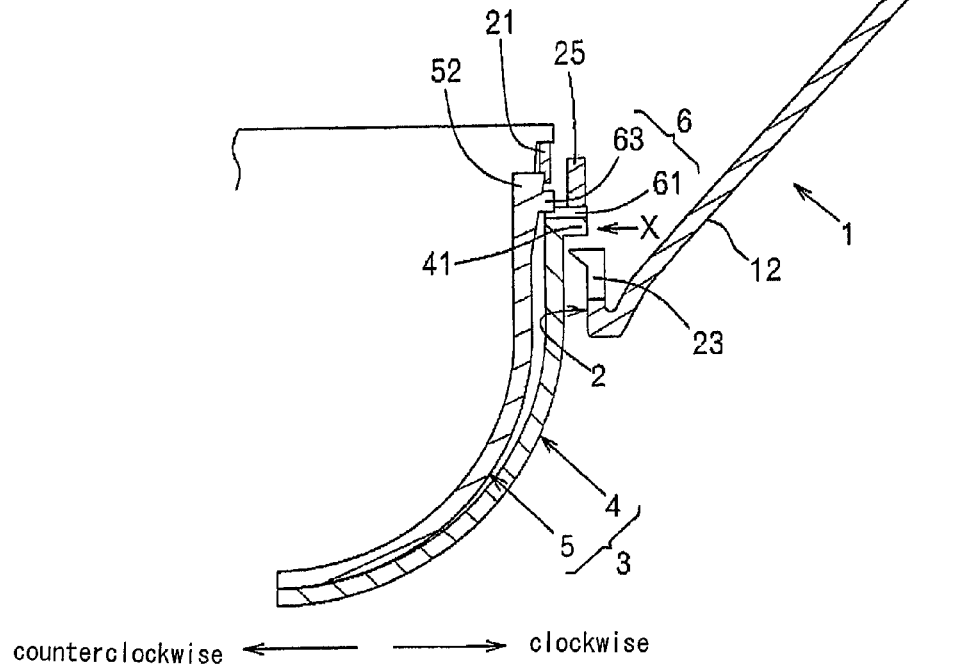
counterclockwise ←——→ clockwise
(b)
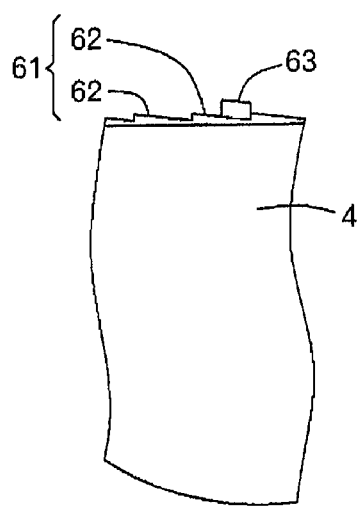

[Fig. 6]
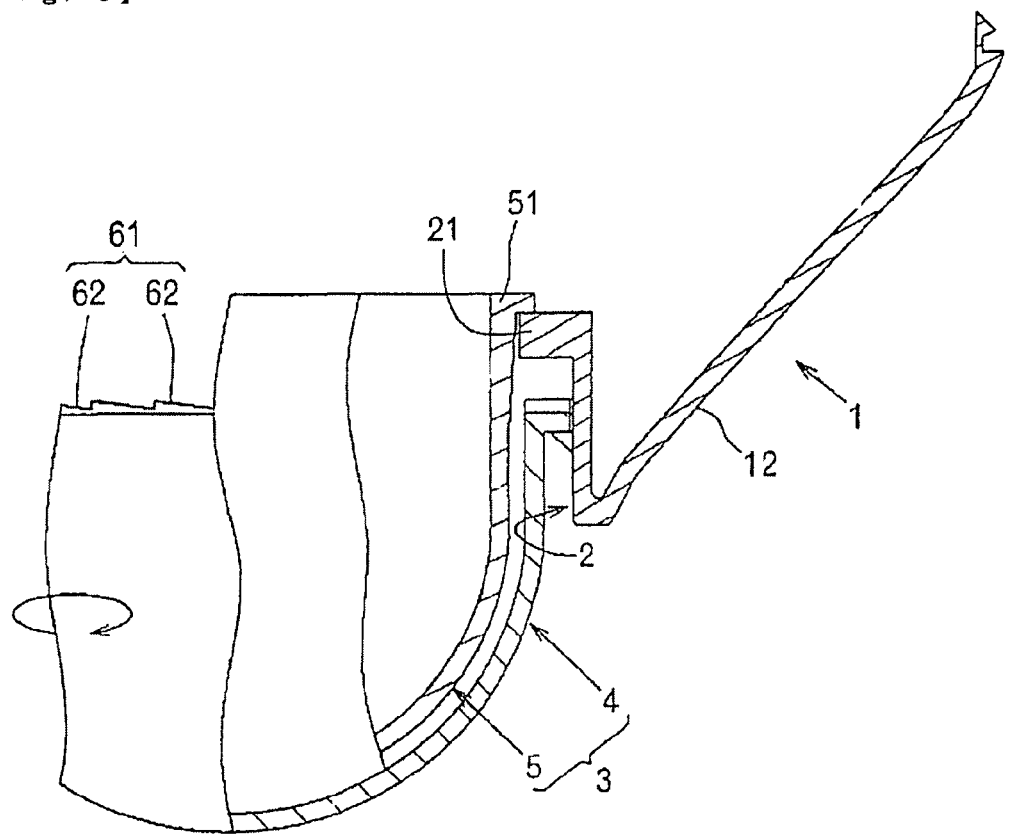
[Fig. 7]
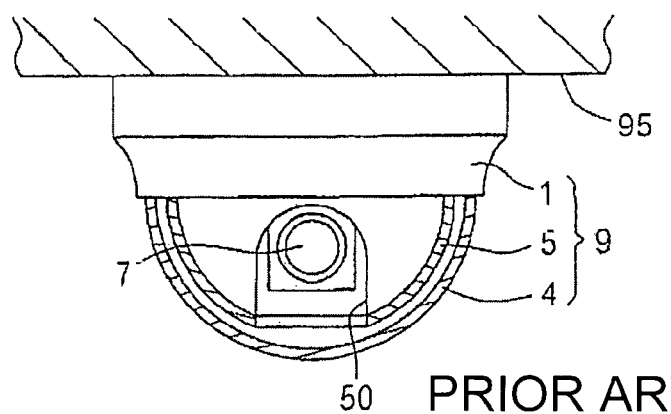
PRIOR ART

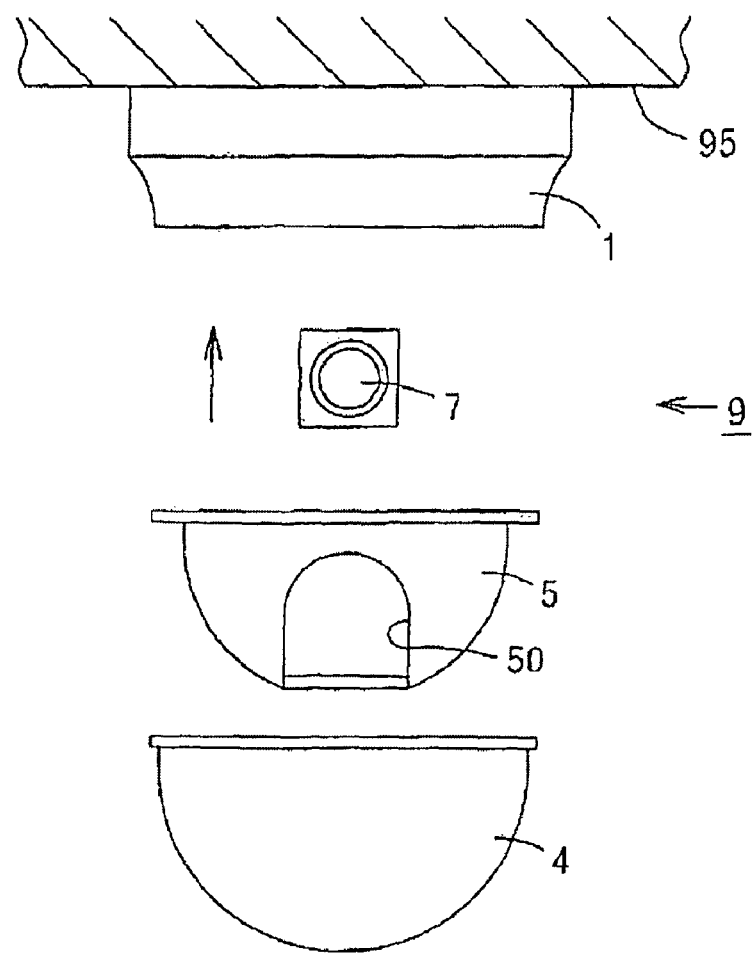
[Fig. 8]
PRIOR ART

MONITOR CAMERA HAVING A DUAL STRUCTURE COVER

TECHNICAL FIELD

The present invention relates to a monitor camera having a dome-type cover of a dual-structure having an inner cover and an outer cover.

BACKGROUND ART

An example of a monitor camera (9) having a dome-type cover of a dual structure having an inner cover and an outer cover is shown in FIGS. 7 and 8. It includes a pedestal (1) to be attached to a mounting surface (95) such as a ceiling; an outer cover (4) through which it is hard to see inside from outside although the outer cover is made of a transparent material; an inner cover (5) having an open window (50); and an imaging device (7) that is disposed inside the inner cover (5) and can take images through the open window (50). To secure safety and enhance customer satisfaction and for other purposes in hospitals, hotels, department stores, etc., it is necessary that such a monitor camera is embedded in the ceiling, wall or the like of such buildings so as not to be noticeable. Therefore, the inside of the outer cover (4) is difficult to see from outside.

To install the monitor camera (9), first the pedestal (1) equipped with the imaging device (7) is fixed to the mounting surface (95). Then, in relation to the location of the subject, the direction of the shooting of the imaging device (7) is adjusted. Next, the inner cover (5) and the outer cover (4) are attached to the pedestal (1) such that the open window (50) of the inner cover (5) is in the direction of shooting.

Reference Patent: JP2004-356668A

DISCLOSURE OF INVENTION

Problems to be Solved by the Invention

However, prior-art monitor cameras have the following disadvantages.

In the prior-art monitor camera (9), the open window (50) of the inner cover (5) is aligned in the direction of shooting based on visual estimates. That is, the direction of the imaging device (7) is adjusted according to the position of the subject, and the orientation of the inner cover (5) is adjusted such that the open window (50) faces that direction. Then, the outer cover (4) and the inner cover (5) are attached to the pedestal (1).

Therefore, after the outer cover (4) and the inner cover (5) are attached to the pedestal (1), the direction of shooting and the position of the open window (50) sometimes do not match. In such a case, it is necessary to remove the outer cover (4) and readjust the orientation of the inner cover (5). This operation has to be repeated until the position of the open window (50) comes in line with the direction of shooting, thereby hindering the attachment operation of the monitor camera (9) to be performed efficiently. Among such monitor cameras as the monitor camera (9), the orientation of the inner cover (5) of some cameras cannot be rearranged unless the inner cover (5) is removed from the pedestal (1). In this case, the adjustment of the orientation of the inner cover (5) is more troublesome.

The present invention is to easily and efficiently perform the positioning of the open window (50) by adjusting the open window (50) in the direction of shooting by manually operating the outer cover (4) while the inner cover (5) and the outer cover (4) are attached to the pedestal (1).

Means for Solving the Problems

The monitor camera comprises a pedestal (1) to be attached to a mounting surface (95), an imaging device (7) rotatably attached so as to be rotatable around the central axis L of the pedestal (1), and a dome-type cover (3) having a window (30) and being rotatably attached to the pedestal (1) so as to cover the imaging device (7), the dome-type cover (3) comprising an inner cover (5) having an open window (50) in the position corresponding to the window (30) and an outer cover (4) placed over the inner cover (5).

The outer cover (4) and the inner cover (5) have an engagement part (6) at which both the covers (4) and (5) can be engaged by a specific manual operation of the outer cover (4), and when both the covers (4) and (5) are in engagement, by rotating the outer cover (4), the inner cover (5) is rotated concurrently and the open window (50) of the inner cover (5) is arranged to be in the direction of shooting of the imaging device (7).

Moreover, the engagement part (6) has a one-way clutch mechanism that enables the inner cover (5) and the outer cover (4) to rotate in an integrated manner only in response to the outer cover (4) being rotated in one direction.

With respect to the monitor camera (9) of the present invention, by manually performing the engagement of the outer cover (4) with the inner cover (5) and then rotating the outer cover (4), the inner cover (5) can be rotated together. Thus, after attaching the inner cover (5) and the outer cover (4) to the pedestal (1), the open window (50) of the inner cover (5) can be aligned in the direction of shooting. When attaching the inner cover (5) to the pedestal (1), no care needs to be taken about the position of the open window (50) of the inner cover (5). For this reason, the installation operation of the monitor camera (9) can be carried out easily and efficiently.

Moreover, because of the one-way clutch mechanism provided for the inner cover (5) and the outer cover (4), unless the outer cover (4) is rotated in a specific direction, the inner cover (5) cannot be rotated together. This, therefore, prevents improper tampering or the situation in which the orientation of the open window (50) is altered and the monitor camera (9) cannot take images properly.

BRIEF DESCRIPTION OF THE DRAWINGS

FIG. 1 is an exploded perspective view of the monitor camera from below.

FIG. 2 is a perspective view of the pedestal unit and the imaging device.

FIG. 3 is an exploded perspective view of the monitor camera from above.

FIG. 4(a) is a side cross-sectional view when the inner cover and the outer cover are not in engagement, and FIG. 4(b) is a view of the camera of FIG. 4(a) viewed in the direction X.

FIG. 5(a) is a side cross-sectional view when the inner cover and the outer cover are in engagement, and FIG. 5(b) is a view of the camera of FIG. 4(a) when viewed in the direction X.

FIG. 6 is an explanatory diagram showing when the inward-hooking lugs of the inner cover are hooked to the inward-facing flange of the pedestal cover.

FIG. 7 is an elevational view of a conventional monitor camera.

FIG. 8 is an exploded elevational view of a conventional monitor.

Explanation of Reference Numbers (1) Pedestal
(2) Installation opening
(3) Dome-type cover
(4) Outer cover
(5) Inner cover
(6) Engagement part
(7) Imaging device

BEST MODE FOR CARRYING OUT THE INVENTION

Hereinafter, an embodiment of the present invention is described with reference to the drawings.

FIG. 1 is an exploded perspective view of a monitor camera (9) according to this embodiment. The monitor camera (9) is composed of a pedestal (1), an imaging device (7) (see FIG. 2) mounted on the pedestal (1), and a dome-type cover (3) covering the imaging device (7). The dome-type cover (3) is of a dual structure having an inner cover (5) and an outer cover (4).

FIG. 1 to FIG. 6 show the monitor camera (9) when it is attached to the ceiling facing downward. Hereinafter, "up" refers to the ceiling side and "down" refers to the ground side.

The pedestal (1) is composed of a pedestal body (11) and a pedestal cover (12) detachably fitted to the pedestal body (11). The dome-type cover (3) is attached to the pedestal cover (12), and as shown in FIG. 2, the imaging device (7) is attached to the pedestal body (11).

In this embodiment, as shown in FIG. 4(a), in a normal condition, there is a vertical space provided between the inner cover (5) and the outer cover (4), and even when the outer cover (4) is rotated, the outer cover (4) alone swivels freely and the inner cover (5) does not rotate. As shown in FIG. 5(a), when the outer cover (4) is pushed upward, the outer cover (4) and the inner cover (5) engage, thereby making the inner cover (5) rotatable. Hereinafter, this configuration is described.

As shown in FIG. 2, a camera (71), which is the principal component of the imaging device (7), is attached to the pedestal body (11) via a bracket (73), and the bracket (73) and the camera (71) are rotatable around the central axis L of the pedestal (1) (in a panning direction). The camera (71) is rotatable also around the pivot (74) of the bracket (73) within the vertical plane containing the central axis L (in a tilting direction indicated by the arrow B in FIG. 2). A circuit board (72) is attached to the pedestal body (11).

The pedestal cover (12) shown in FIG. 1 is composed of a synthetic resin and it appears like an inverted cone. In the center of the lower end of the pedestal cover (12), a circular installation opening (2) is disposed for attachment of the dome-type cover (3). From the peripheral wall (20) of the installation opening (2), a flange (21) and retaining members (23) for retaining the upper end of the outer cover (4) and the inner cover (5) project inward as described below. The inward-facing flange (21) is provided along the entire peripheral wall (20) and has grooves (22) at 3 different locations spaced equally. The grooves (22), when the inner cover (5) is fitted in the installation opening (2), allow the ratchet lugs (63) (described below) disposed on the inner cover (5) to pass through.

The retaining members (23) are located more outwardly (lower) than the inward-facing flange (21) and disposed on the peripheral wall (20) at 3 different locations spaced equally apart in the circumferential direction. Each retaining member (23) is positioned in a notch (24) disposed in the peripheral wall (20), and the upper edge thereof has an inward (i.e., the center-facing side of the installation opening (2)) protrusion (23a). Each protrusion (23a) is angled in a direction such that the protrusions (23a) allow push-fitting of the outer cover (4) from below.

On the inward-facing flange (21) of the installation opening (2), resilient members (25) are provided for urging the outer cover (4) outward (downward). The resilient members (25) are formed as an integral part of the pedestal cover (12), the base of each resilient member (25) is connected to the inward-facing flange (21), and the lower surface of the free end portion thereof has a pressing surface (25a) having an arcuate bulge. The pressing surface (25a) is located lower than the lower surface of the inward-facing flange (21).

The outer cover (4) is, as with the conventional covers, of a transparent material formed with a synthetic resin, and it is difficult to see inside from outside. The outer cover (4) is formed in a hemispherical shape whose upper face is an opening, and has an outward-facing flange (41) disposed around the entire rim of the opening. When the outer cover (4) is fitted to the pedestal cover (12), the outward-facing flange (41) deflects outward the retaining members (23) of the installation opening (2) and is pushed into place. When the outer cover (4) is fitted into place, each resilient member (25) of the installation opening (2) meets the upper side of the outward-facing flange (41) and urges the outer cover (4) downward. On the edge of the outer cover (4) on the side of the opening including the upper surface of the outward-facing flange (41), a row of ratchet teeth (61) are provided along the entire circumference.

The inner cover (5) of the dome-type cover (3) is of an opaque material formed with a synthetic resin. The inner cover (5) is formed in a hemispherical shape whose upper face is an opening, and at one location, an open window (50) is disposed extending in the tilting direction (arrow B in FIG. 2) from the top of the hemispherical body. As with the conventional inner covers, the inner cover (5) hides the imaging device (7) from the outside of the dome-type cover (3), and the open window (50) has a width sufficient for the installed camera (71) to take images through.

On the rim of the upper-end opening of the inner cover (5), notches (53) are provided at 6 different locations spaced equally apart in the circumferential direction. The 6 portions sandwiched between notches (53) and (53) form outward-hooking lugs (52) whose upper edges are inclined outward. Among the 6 outward-hooking lugs (52), ratchet lugs (63) are provided on the outer surface of 3 outward-hooking lugs (52), which engage with/disengage from the row of ratchet teeth (61) of the outer cover (4). That is, the row of ratchet teeth (61) and the ratchet lugs (63) form an engagement portion (6) for having the inner cover (5) and the outer cover (4) rotate together. As shown in FIG. 5(b), the surface of the ratchet lugs (63) on the side of the row of ratchet teeth (61) is inclined in a direction such that the ratchet lugs (63) allow the ratchet teeth (62) to rotate independently in response to the clockwise rotation of the ratchet teeth (62) (letting the ratchet teeth (62) rotate independently).

Thereby, each ratchet tooth (62) of the row of ratchet teeth (61) and the ratchet lugs (63) do not engage when the outer cover (4) is rotated in the clockwise direction from below and they engage when the outer cover (4) is rotated in the counterclockwise direction from below.

On the edge of the opening between the adjacent outward-hooking lugs (52) and (52) of the inner cover (5) shown in FIG. 1, an inward-hooking lug (51) that faces outward is disposed. There are 6 inward-hooking lugs (51) spaced equally apart in the circumferential direction, and the inward-hooking lugs (51) can be placed on the upper surface of the inward-facing flange (21) of the installation opening (2) of the aforementioned pedestal cover (12).

When the inner cover (5) is installed from the inside of the installation opening (2), the outward-hooking lugs (52) are pushed by the inward-facing flange (21) and resiliently deformed inward, thereby enabling the outward-hooking lugs (52) to pass the inward-facing flange (21). After the outward-hooking lugs (52) have passed the inward-facing flange (21), the outward-hooking lugs (52) resiliently returns to their original position and the inner cover (5) is hooked to the pedestal cover (12).

When the inner cover (5) is attached to the installation opening (2), if the ratchet lugs (63) of the inner cover (5) are aligned with the aforementioned grooves (22), the ratchet lugs (63) do not get in the way when attaching the inner cover (5).

The inward-hooking lugs (51) of the inner cover (5) are placed over the upper surface of the inward-facing flange (21) (see FIG. 6), and the inward-hooking lugs (51) and the outward-hooking lugs (52) sandwich the inward-facing flange (21). In this manner, the inner cover (5) can be rotatably attached at the installation opening (2) to the pedestal cover (12) without allowing the inner cover to move vertically.

As described above, when the outer cover (4) is fitted to the installation opening (2) by pushing the outer cover (4) from below, the resilient members (25) of the pedestal cover (12) meet the row of ratchet teeth (61). As shown in FIG. 4(a), the outer cover (4) is urged downward and caught by the retaining members (23). In this state, as shown in FIG. 4(b), the row of ratchet teeth (61) of the outer cover (4) are at a height at which the teeth do not engage with the ratchet lugs (63) of the inner cover (5).

As shown in FIG. 5(a), when the outer cover (4) is pushed upward against the resilient members (25), i.e., pushed toward the inner cover (5), the row of ratchet teeth (61) reach a height for engagement with the ratchet lugs (63) as shown in FIG. 5(b).

When the outer cover (4) is turned in the counterclockwise direction while being pushed up by hand, the row of ratchet teeth (61) come into engagement with the ratchet lugs (63) and rotate, thereby enabling the inner cover (5) and the outer cover (4) to be rotated together. Thus, after attaching the inner cover (5) and the outer cover (4) to the pedestal (1), by manually operating the outer cover (4), the open window (50) of the inner cover (5) can be adjusted to be in the position corresponding to the camera lens.

When the inner cover (5) is attached to the installation opening (2) of the pedestal cover (12), no care needs to be taken about the position of the open window (50). Therefore, the installation operation of the monitor camera (9) such that the open window (50) of the inner cover (5) is arranged to be inline with the cameral lens can be performed easily and efficiently.

Although the row of ratchet teeth (61) are always in contact with the resilient members (25), because the surface of the resilient members (25) in contact with the row of ratchet teeth (61) are formed in an arcuate shape and is slippery against the row of ratchet teeth (61), the resilient members (25) do not obstruct the rotation of the outer cover (4).

As described above, unless the operation is performed in a specific sequence, i.e., the outer cover (4) is pushed upward and turned in the counterclockwise direction, the inner cover (5) cannot be rotated, thereby making it difficult to rotate the inner cover (5) from outside by improper tampering which could make masking the camera lens.

Moreover, for the installation of the dome-type cover (3) to the pedestal cover (12), first, the outer cover (4) is fitted from outside to the installation opening (2) of the pedestal cover (12). Next, the inner cover (5) is fitted to the installation opening (2) from inside the pedestal cover (12). These installation operations do not require equipments or the like and can be carried out by hand, thereby enabling the efficiency of the installation operation of the dome-type cover (3) to be enhanced.

Furthermore, as a modification of the above-described embodiment, the following can be conceived. For example, some installation operators may try to loosen the outer cover (4) by turning it. It is common for these people to rotate the outer cover (4) in the counterclockwise direction and they would wish that when the outer cover (4) is pushed upward and rotated in the clockwise direction, the inner cover (5) is rotated concurrently, thereby enabling an adjustment to be made. In this case, the inclination of the ratchet teeth (62) of the row of ratchet teeth (61) and the inclination of the ratchet lugs (63) have only to be made opposite to those described above.

In an embodiment of the present invention, the engagement part (6) of the outer cover (4) and the inner cover (5) is not limited to the combination of the row of ratchet teeth (61) and the ratchet lugs (63). It is sufficient that the engagement part (6) has a one-way clutch mechanism in which the outer cover (4) and the inner cover (5) can be engaged by pushing the outer cover (4) toward the inner cover (5), and the inner cover (5) can be rotated concurrently only when the outer cover (4) in engagement is rotated.

Although in the embodiment described above, the resilient members (25) are formed as an integral part of the pedestal cover (12), the resilient members (25) may be formed integral with the inner cover (5), e.g., integral with the outward-hooking lugs (52). Or the resilient members (25) may be disposed between the outer cover (4) and the inner cover (5), thereby urging the outer cover (4) downward.

The invention claimed is:
1. A monitor camera comprising:
a pedestal attached to a mounting surface,
an imaging device rotatably attached so as to be rotatable around a central axis L of the pedestal, and
a dome-type cover having a window, said dome-type cover being rotatably attached to the pedestal so as to cover the imaging device, the dome-type cover including an inner cover having an open window in a position corresponding to the window and an outer cover placed over the inner cover,
the outer cover including a row of ratchet teeth provided along an opening of the outer cover, the outer cover being rotatably and vertically movably attached to the pedestal, and being urged in a direction of popping out of the pedestal by resilient members located between the outer cover and the inner cover,
the inner cover including ratchet lugs engageable with the ratchet teeth, the inner cover being rotatably attached to the pedestal,
the row of ratchet teeth of the outer cover and the ratchet lugs of the inner cover providing an engagement part for engaging the outer cover and the inner cover, and being engageable by pushing the outer cover against the resilient members, when the both covers are in engagement, rotating the outer cover resulting in the open window of the inner cover being arranged in the direction of shooting of the imaging device, and when a force applied to the outer cover is then removed, the row of ratchet teeth and the ratchet lugs being disengaged.

2. The monitor camera according to claim 1, wherein the pedestal has an installation opening on its underside, disposed on the installation opening are an inward-facing flange, resilient members located lower than the inward-facing flange, and retaining members located lower than the resilient members, disposed along the edge of the opening of the outer cover is an outward-facing flange that is sandwiched between the inward-facing flange and the retaining members of the pedestal, is urged by the resilient members and is in contact with the retaining members, alternately disposed along the edge of the opening of the inner cover in the circumferential direction are inward-hooking lugs and outward-hooking lugs that rotatably retain the inner cover on the pedestal with the inward-facing flange of the pedestal being sandwiched therebetween.

3. The monitor camera according to claim 2, wherein the retaining members disposed on the pedestal are elastically deformable, allow entry of the outward-facing flange of the outer cover into the side where the outer cover is push-fitted and prevent the outward-facing flange from dislocating once the outer cover has entered, the outward-hooking lugs of the inner cover are elastically deformable, allow the inner cover to be push-fitted outward from the inside of the pedestal against the inward-facing flange of the installation opening of the pedestal, and once the inner cover has been push-fitted, prevents upward dislocation by holding on to the aforementioned inward-facing flange, and grooves are disposed on the inward-facing flange through which the ratchet lugs can pass.

* * * * *